Patented Oct. 13, 1931

1,827,680

UNITED STATES PATENT OFFICE

EDMOND T. TISZA AND BERNARD JOOS, OF YONKERS, NEW YORK, ASSIGNORS TO THE PYRIDIUM CORPORATION, OF NEPERA PARK, NEW YORK, A CORPORATION OF NEW YORK

ARSINE OXIDE SUBSTITUTION PRODUCTS OF PHENYL-AZO-ALPHA-ALPHA-DIAMINO-PYRIDINE

No Drawing.     Application filed May 7, 1929. Serial No. 361,266.

This invention relates to arsine-oxide substitution products of phenyl-azo-alpha-alpha-diaminopyridine, and to methods of obtaining same.

One of the primary objects of the invention is the provision of a method of introducing tri-valent arsenic into phenyl-azo-alpha-alpha-diaminopyridine, its homologues, analogues, or substitution products.

Compounds of this type, of which para-arsine-oxide-phenyl-azo-alpha-alpha-diaminopyridine is the base, are preferably obtained from the hydrochloride, and the hydrochloride is prepared by coupling diazotized amino-phenyl-arsine-oxides with diaminopyridine, in the presence of hydrochloric acid.

The hydrochloride so formed is a brick red to dark brown red micro-crystalline powder, melting with decomposition at a range from about 225° to 235° C. It is soluble in methyl-alcohol, slightly soluble in cold or hot water, and insoluble in ether, chloroform, acetone and toluol.

The base; namely, para-arsine-oxide-phenyl-azo-alpha-alpha-diaminopyridine, like that described in our copending application Serial No. 361,265, of even date herewith has an amphoteric character. That is, it is able to build salts with acids or with alkalies. When an alkali, as for instance, sodium hydroxide, is added to the aqueous solution of the hydrochloride, the loosely bound acid is first neutralized, and the free base precipitated. Further addition of alkali dissolves the precipitate, and forms the alkali salt.

The alkali salt, as for instance, the sodium salt may be precipitated from its solution by adding an excess of concentrated sodium hydroxide solution. This salt which is in micro-crystalline form, is soluble in methyl-alcohol, but insoluble in ether, chloroform, acetone or toluol.

The free base, that is, para-arsine-oxide-phenyl-azo-alpha-alpha-diaminopyridine, may be obtained either from the sodium salt solution by precipitation with an acid, or from the hydrochloric salt solution by precipitation with an alkali, and it occurs in the form of a yellow powder.

Since the formula for phenyl-azo-alpha-alpha-diaminopyridine is:—

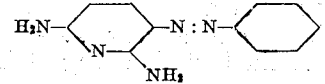

and as this compound is prepared through diazotization of p-amino-phenyl-arsine-oxide, and coupling it with alpha-alpha-diaminopyridine, the formula of the base must be the following:—

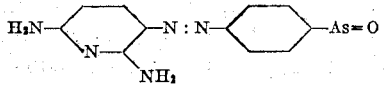

In the above formula the place for the copulation is indicated as the beta position in the pyridine nucleus. In general the azo group will go into para position to the amino group, or into the ortho, if the para position is occupied. In this case, the azo group is in para position to one of the amino groups, and in ortho position to the other. The new compounds will, therefore, be para-arsine-oxide-phenyl-azo-alpha-alpha-diaminopyridine, its acid or alkali salts. There is a possibility that some of the gamma azo compound is formed, and that this isomer is present in the above described preparation. But if present, it is in very small amounts. These compounds show a distinct bactericidal action in vitro, and also tripanocidal action to a certain extent. They are intended for therapeutical use, and to serve as a starting material for the production of new substances.

These new substances may also be made by using either substitution products of alpha-alpha-diaminopyridine or isomers or substitution products of p-amino-phenyl-arsine-oxide. Therefore, we do not intend to limit ourselves to the above described compounds.

An example of the method of preparing the improved compounds is given below:—

*Example.*—P-amino-phenyl-arsine-oxide to the amount of 6.58 gms. is covered in a beaker with 38.6 cc. hydrochloric acid of 8.87%. The mixture is cooled to 14° C., and diazotized with a solution of 2.54 gms. sodium nitrite in 25 cc. of distilled water. About 22 cc. of the sodium nitrite solution above mentioned is sufficient to bring all of the diazonium salt into solution.

To the diazonium salt solution, a solution of 10 gms. alpha-alpha-diaminopyridine in 50 cc. hydrochloric acid of 20% is added, and the copulation takes place immediately. The mixture is then put aside, and after standing a few hours is filtered on a suction filter, washed with water, and dried in a vacuum desiccator.

From the hydrochloric salt as prepared above, the sodium salt may be obtained as previously described, by the addition of sufficient alkali, and the base may be obtained from either the acid or the alkaline salt, in the first instance, by precipitation with an alkali, and in the second instance, by precipitation with an acid.

What is claimed as new is:—

1. The method of obtaining arsine-oxide-substitution products of phenyl-azo-alpha-alpha-diaminopyridine, which consists in diazotizing p-amino-phenyl-arsine-oxide in acid solution, and coupling the diazotized p-amino-phenyl-arsine-oxide with alpha-alpha-diaminopyridine.

2. The method of obtaining arsine-oxide-substitution products of phenyl-azo-alpha-alpha-diaminopyridine, which consists in diazotizing p-amino-phenyl-arsine-oxide in acid solution, and coupling the diazotized p-amino-phenyl-arsine-oxide with alpha-alpha-diaminopyridine, dissolving the resulting acid salt in water and precipitating the free base with alkali solution.

3. The method of obtaining arsine-oxide-substitution products of phenyl-azo-alpha-alpha-diamino-pyridine, which consists in diazotizing p-amino-phenyl-arsine-oxide in acid solution; coupling the diazotized p-amino-phenyl-arsine-oxide with alpha-alpha-diaminopyridine; dissolving the resulting acid-salt in water; precipitating the free base (which is substantially insoluble in water) by neutralizing the loosely-bound acid with the calculated amount of alkali; dissolving the precipitate in dilute alkali; and precipitating the alkali-metal salt by adding an excess of alkali.

4. As a new article of manufacture, para-arsine-oxide-phenyl-azo-alpha-alpha-diaminopyridine, having the following formula:—

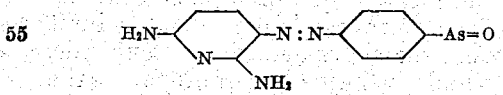

Signed at Yonkers, in the county of Westchester and State of New York, this 2nd day of May, A. D. 1929.

EDMOND T. TISZA.
BERNARD JOOS.